United States Patent
Rosenberg

(10) Patent No.: US 11,379,682 B2
(45) Date of Patent: Jul. 5, 2022

(54) SYSTEM AND METHOD FOR RECOGNIZING UNATTENDED HUMANS WHO REQUIRE SUPERVISION

(71) Applicant: Tamir Rosenberg, Stevenson Ranch, CA (US)

(72) Inventor: Tamir Rosenberg, Stevenson Ranch, CA (US)

( * ) Notice: Subject to any disclaimer, the term of this patent is extended or adjusted under 35 U.S.C. 154(b) by 0 days.

(21) Appl. No.: 16/922,881

(22) Filed: Jul. 7, 2020

(65) Prior Publication Data
US 2021/0383129 A1 Dec. 9, 2021

Related U.S. Application Data

(60) Provisional application No. 63/035,805, filed on Jun. 7, 2020.

(51) Int. Cl.
| | | |
|---|---|---|
| *G06K 9/00* | (2006.01) | |
| *G08B 21/22* | (2006.01) | |
| *G08B 21/04* | (2006.01) | |
| *G08B 21/02* | (2006.01) | |
| *G06K 9/62* | (2006.01) | |

(52) U.S. Cl.
CPC ..... *G06K 9/00771* (2013.01); *G06K 9/00362* (2013.01); *G06K 9/6215* (2013.01); *G08B 21/0283* (2013.01); *G08B 21/0476* (2013.01); *G08B 21/22* (2013.01)

(58) Field of Classification Search
CPC ........... G06K 9/00771; G06K 9/00362; G06K 9/6215; G08B 21/0283; G08B 21/0476; G08B 21/22
See application file for complete search history.

(56) References Cited

U.S. PATENT DOCUMENTS

| | | | | |
|---|---|---|---|---|
| 2015/0223731 | A1* | 8/2015 | Sahin | A61B 5/1123 600/301 |
| 2019/0311595 | A1* | 10/2019 | Lacy | G08B 21/14 |
| 2020/0051422 | A1* | 2/2020 | Maeng | G06K 9/00342 |
| 2021/0166538 | A1* | 6/2021 | Hill | G08B 5/36 |
| 2021/0279603 | A1* | 9/2021 | Teran Matus | G06N 5/04 |

\* cited by examiner

*Primary Examiner* — Dakshesh D Parikh

(57) ABSTRACT

A system for recognizing unattended humans who require supervision is disclosed. The system includes monitoring content from one or more cameras. The system includes processing an artificial intelligence (AI) algorithm, wherein the AI algorithm is configured to detect unattended humans. The system includes processing one or more images, received from the one or more cameras, based on one or more AI algorithm rules. The system includes detecting an unattended human based on the processing of the one or more images, wherein the unattended human is in close proximity to a hazard. The system includes alerting one or more authorized individuals, with one or more notifications of the unattended human's close proximity to the hazard.

22 Claims, 2 Drawing Sheets

SYSTEM AND METHOD FOR RECOGNIZING UNATTENDED HUMANS WHO REQUIRE SUPERVISION

CROSS-REFERENCE TO RELATED APPLICATIONS

This application claims the benefit of U.S. Provisional Application Ser. No. 63/035,805, titled "System and Method for Recognizing Unattended Humans Who Require Supervision," filed on Jun. 7, 2020. This application incorporates the entire contents of the foregoing application herein by reference.

FIELD OF THE INVENTION

The present invention generally relates to safety. More specifically, the present invention relates to an automated system based on artificial intelligence (AI) for detecting unattended humans who require supervision and sending notifications in to prevent injury and even save lives.

BACKGROUND

While AI has been gaining popularity in many industrialized nations, little AI has been leveraged for use in safety for the general public, particularly in regard to those who require supervision—such as young children, people with disabilities, the elderly, etc.

For example, European Patent No. EP3164990B1 by Glazer describes systems and methods for configuring baby monitor cameras to provide uniform data sets for analysis.

United States Patent No. US2020066131A1 by Gross describes child emergency monitoring and reporting system and method.

U.S. Patent No. US2020069076A1 by Lee describes comfort system for infants and young children through artificial intelligence and micro vibration and its control method.

U.S. Patent No. US2020048817A1 by Jang describes method. for preventing accident performed by home appliance and cloud server using artificial intelligence.

U.S. Pat. No. 10,643,446B2 by Kusens, et al. describes utilizing artificial intelligence to detect objects or patient safety events in a patient room.

U.S. Pat. No. 10,643,080 B2 by Rokade, et al. describes artificial intelligence and image processing-based work force safety.

U.S. Patent No. US2020065612A1 by Xu, et al. describes interactive artificial intelligence analytical system.

SUMMARY

A system and method that is configured to recognize unattended humans who require supervision, is described. The device herein disclosed and described provides a solution to the shortcomings in the prior art through the disclosure of a monitoring system that leverages AI. An object of the invention is to enhance the safety of individuals who require supervision. For example, a daughter who hires an in-home health care worker for her senile father is concerned that her father may wander alone outside into the busy street near her home, installs the invention in her front yard. The device continuously monitors the yard for the presence of the father unsupervised. Once such an event is detected, the device immediately notifies the caregiver and the daughter of the situation via their mobile devices so they can intercept the father before he enters a dangerous environment. During these processes, the data will be checked with AI and/or pre-defined rules (that can be defined by the user) to find dangerous and unsafe situations (father alone, caretaker far from father, father wanders outside, etc).

In one aspect of the disclosure, a system for recognizing unattended humans who require supervision is disclosed. The system includes monitoring one or more cameras. The system includes processing an artificial intelligence (AI) algorithm, wherein the AI algorithm is configured to detect unattended humans who require supervision. The system includes processing one or more images, received from the one or more cameras, based on one or more AI algorithm rules. The system includes detecting an unattended human based on the processing of the one or more images, wherein the unattended human is in close proximity to a pool. The system includes alerting one or more authorized individuals, with one or more notifications of the unattended human's close proximity to the pool.

In one embodiment, the one or more cameras are configured to capture video images.

In one embodiment, the captured video images are configured to be analyzed to classify humans or classify predefined hazardous objects.

In one embodiment, the one or more sensors are configured to detect one or more of thermal imaging, temperature, humidity, gas detection, motion detectors, electrical field detection, smoke, etc.

In one embodiment, the system further includes analyzing the one or more images captured from the one or more cameras.

In one embodiment, the AI algorithm rules are predefined.

In one embodiment, the authorized individuals are pre-determined, parents, caregivers, or a member of a predefined contact list of the unattended human.

In one embodiment, the one or more notifications are an alarm, a voice message, a sound, a message, a phone call, or an alert on a mobile device, etc.

In one embodiment, the system further includes customizing one or more recognition capabilities, wherein the one or more recognition capabilities are configured to recognize the authorized individual and/or service or support animal associated with the unattended human.

In one embodiment, the system further includes customizing one or more inanimate object recognition capabilities, wherein the inanimate object recognition capabilities are configured to recognize hazardous objects.

In one embodiment, the recognized hazardous objects are predetermined or manually set by an authorized individual particular to the unattended human.

In one embodiment, the system further includes detecting the unattended human not in the presence of an authorized individual and sending an alert to the authorized individual.

In one embodiment, the system further includes recognizing the unattended human, determining a hazardous object, condition, or scenario, and notifying an authorized individual with the occurrence of the hazardous object, condition, or scenario and a location.

In one embodiment, the hazardous object is one or more of a swimming pool, a hot grill, a street, or life-threatening situation.

In one embodiment, the one or more cameras are configured to be connected to one or more networks, including but not limited to: a wired network, a wireless network, a cellular network, or a satellite network.

In one embodiment, the wireless networks are configured to facilitate deployment and relocation of the one or more cameras to accommodate changing or evolving surveillance needs.

In one embodiment, the system further includes determining if the unattended human is a baby, child, or adult.

Another object of the invention is to allow a user to customize the recognition capabilities of the device. For example, in the above situation, the daughter uses a training feature of the system's AI to recognize only the father and his caregiver so that she is not notified of false alarms when other members of her family go out unsupervised.

Another object of the invention is to allow a user to customize inanimate object recognition for the device. For example, a mother can set the system's AI to recognize hazardous objects around the home. She uses a training feature of the AI to recognize objects that she prefers her child to stay away from—such as a space heater, a stove, a weapons cabinet, etc. This object recognition becomes classifiers to the system.

Another object of the invention is to prevent subjects from leaving supervised areas. For example, a toddler leaves a daycare without supervision. The cameras on the invention mounted in the schoolyard detect a toddler in the vicinity without a teacher. The device immediately sends a text message to all school officials to keep the child from leaving the property.

Another object of the invention is to prevent subjects from entering a dangerous area. For example, a toddler walks near a road without supervision. The AI algorithms in the software recognize both the toddler who is unsupervised and the roadway and determine the existence of a hazardous scenario. The software immediately notifies parents of the situation along with the location of the event so they can intervene.

It is briefly noted that upon reading this disclosure, those skilled in the art will recognize various means for carrying out these intended features of the invention. As such it is to be understood that other methods, applications, and systems adapted to the task may be configured to carry out these features and are therefore considered to be within the scope and intent of the present invention, and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

This summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

Disclosed herein are embodiments of apparatuses, methods, and systems pertaining to recognizing unattended humans who required supervision. This description includes drawings, wherein.

DRAWINGS—REFERENCE NUMERALS

Figure 1:
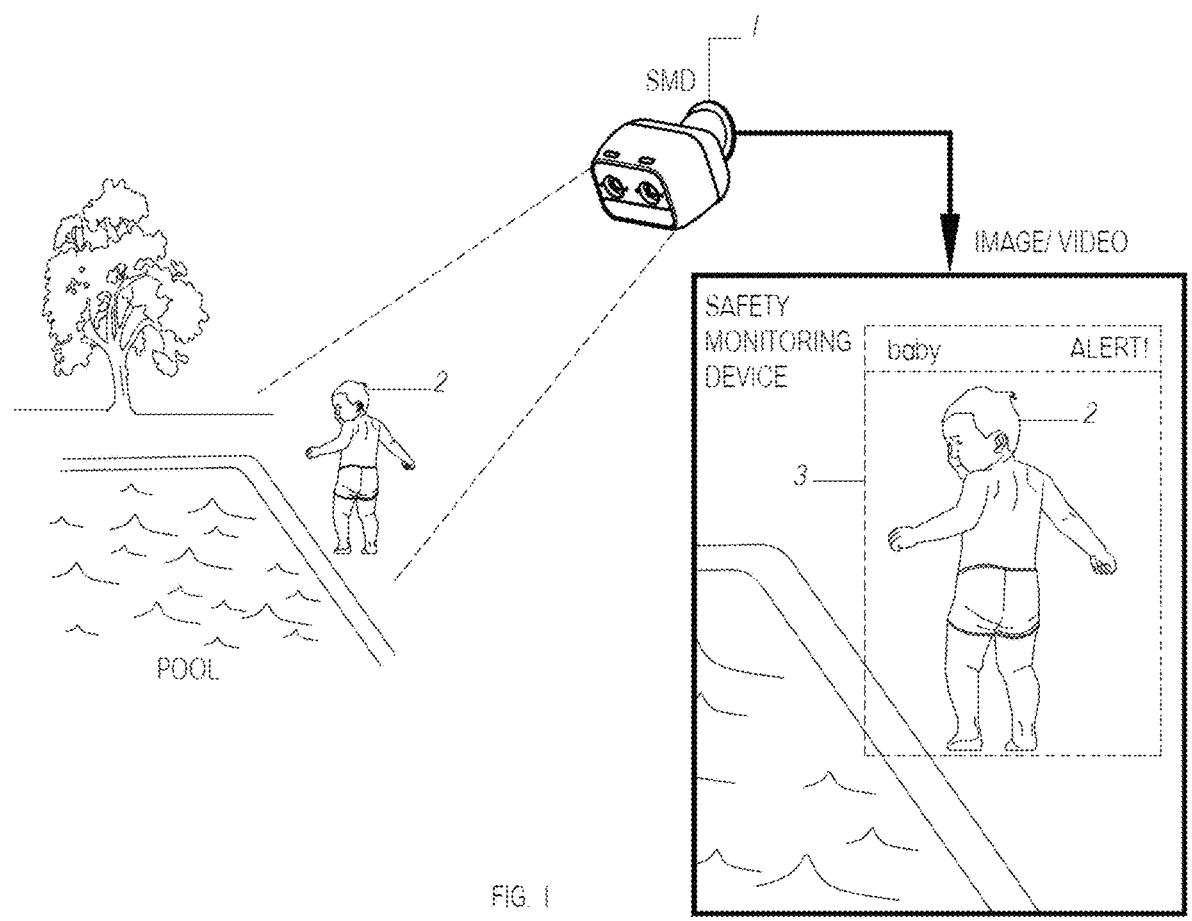
FIG. 1 is a perspective view of the Safety Monitoring Device (hereinafter referred to as 'SMD') 1 installed and activated, in accordance with an example.

1—exemplary of the SMD installed and monitoring the area
2—exemplary of an unsupervised baby near a hazardous area
3—exemplary of an AI algorithm detecting and classifying an unsupervised human as baby
4—exemplary of user equipments (UEs) to operate and configure the system
5—exemplary of the system menu with options the user can set parameters
6—exemplary of a Cloud Services as in use for processing and archiving the content
7—exemplary of a user equipments (UEs) that will receive one or more notifications Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those swilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

ADVANTAGES

The advantages of the present invention can include one or more of the following, without limitation. In one advantage, the invention may help to verify supervision during potentially dangerous situations. Secondly, the disclosure provides the advantage of assisting with various human beings, especially children, from drowning. Thirdly, the present disclosure provides the advantage of helping humans in need of assistance to avoid injuries and/or accidents. Fourth, the present disclosure provides the advantage of assisting human manpower, such as police, lifeguard, Security personnel, and firefighters with providing effective and efficient safety in a crowded area.

DETAILED DESCRIPTION

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

The invention may be embodied in other specific forms without departing from the spirit of essential characteristics thereof. The present embodiments, therefore, should be considered in all respects as illustrative and not restrictive, the scope of the invention being indicated by the appended claims rather than by the foregoing description, and all changes which come within the meaning and range of equivalency of the claims are therefore intended to be embraced therein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The following description is not to be taken in a limiting sense but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

FIG. 1 is a perspective view of the invention installed and activated. A system for recognizing unattended humans who require supervision is disclosed. The system includes monitoring content from one or more cameras. The system includes processing an artificial intelligence algorithm, wherein the AI algorithm is configured to detect unattended humans. The AI processes can be based on a plurality of AI technologies and/or algorithms and/or platforms and/or libraries and/or frameworks, such as but not limited to TensorFlow, Anaconda, YOLO, OpenCV, Caffe, AWS SageMaker, Google AI, Microsoft Azure, and the like. The system includes processing one or more images and/or video, received from the one or more cameras, based on one or more AI algorithm rules. The system includes detecting an unattended human based on the processing of the one or more images, wherein the unattended human is in close proximity to a pool. The system includes notifying one or more authorized individuals, with one or more notifications of the unattended human's close proximity to the pool.

More specifically, A system and method for recognizing unattended humans who require supervision then notifying one or more individuals is disclosed. In one embodiment of the invention, the invention is a safety monitoring device that uses one or more cameras and/or sensors that can be built into the SMD 1 or external to the SMD 1. The system then leverages artificial intelligence (AI) algorithms to process/analyse the images and/or video and detects unattended humans based on predefined rules and notifies/alerts a predefined contact list and/or sets off an alarm. For example, a family with a toddler is concerned about their child wandering near, a backyard pool and they set up the SMD 1 and/or the camera to monitor the pool area. The SMD 1 continuously processes the images and/or video of the backyard that are produced by the camera and detects the child is in the vicinity of the pool without an adult, it sends an alert to the parents' mobile devices and sounds an alarm inside the home to notify them of the situation to prevent the child from falling into the pool and potentially drowning.

Accordingly, the system is configured to analyze one or more factors such as the unsupervised subject or individual, and potentially hazardous scenarios and objects that could create added danger. The SMD 1 is configured to detect the unsupervised subject or child, detect potential hazardous objects or areas, determine the proximity of the child to the hazardous objects or areas. These images can be captured either via one or more cameras through still camera images, or from video recordings. In some instances, there can be a combination of still camera devices and recording devices strategically integrated and positioned within a protected area.

The captured images or recording can be subsequently analyzed to classify any human beings in the area, and access a database to determine if the subject has been registered or previously determined manually or autonomously. The one or more cameras can also be configured with a set of sensors. The set of sensors can be configured to detect one or more of thermal imaging, temperature, humidity, gas detection, motion detectors, electrical field detection, smoke, etc. The captured data from the cameras is analyzed, processed, and subsequently applied and compared to one or more AI rules that have either been predetermined, autonomously generated, or manually inputted. The rules can include factors such as an unsupervised subject, hazardous objects or areas, proximity of the subject to the hazardous object or area, probability of danger, and other factors that may help determine the safety of the unattended human. Upon one or more of the rules being satisfied, the system will immediately associate the unsupervised subject to an authorized individual. The authorized individual can be one or more predetermined persons, parents, caregivers, or a member of a predefined contact list. Accordingly, the system is further configured to alert one or more authorized individuals, with one or more notifications of the unattended human's close proximity to the pool. These alerts 7 can be sent to a user's equipment. The notifications that are sent can be one or more of an alarm, a sound, a message, a phone call, or a pop-up alert. In some examples, the notification that is provided can be pre-set by the authorized person, or assigned based on the severity, or the higher the likelihood of danger.

FIG. 1 shows the invention being used with SMD 1 detecting an unsupervised baby 2 in an unsupervised, hazardous environment. Said SMD 1 may be comprised of but not limited to a high resolution, rotating, 360-degree, video and still camera (such as 4K and the like) with microphones and sensors. The aforementioned sensors may be interchangeable and may include but not be limited to thermal imaging, temperature, humidity, gas detection, motion detectors, electrical field detection, smoke, and the like. The system can analyze the video content and classify the human 3 (as baby, child, adult, etc.), human faces, or other objects of interest in a video scene, such as a predefined hazardous object (such as a swimming pool, hot grill, etc.). The video system includes one or more cameras positioned to cover an area of interest to be monitored. Each camera may be either powered by an electrical cable, network cable (PoE), USB, and/or have its own autonomous energy supply, such as a battery or solar energy sources, and/or any combination of these. The cameras may be coupled to a wired and/or wireless and/or cellular and/or satellite networks. Wireless networks, such as WiFi networks facilitate deployment and relocation of cameras to accommodate changing or evolving surveillance needs.

Figure 2:
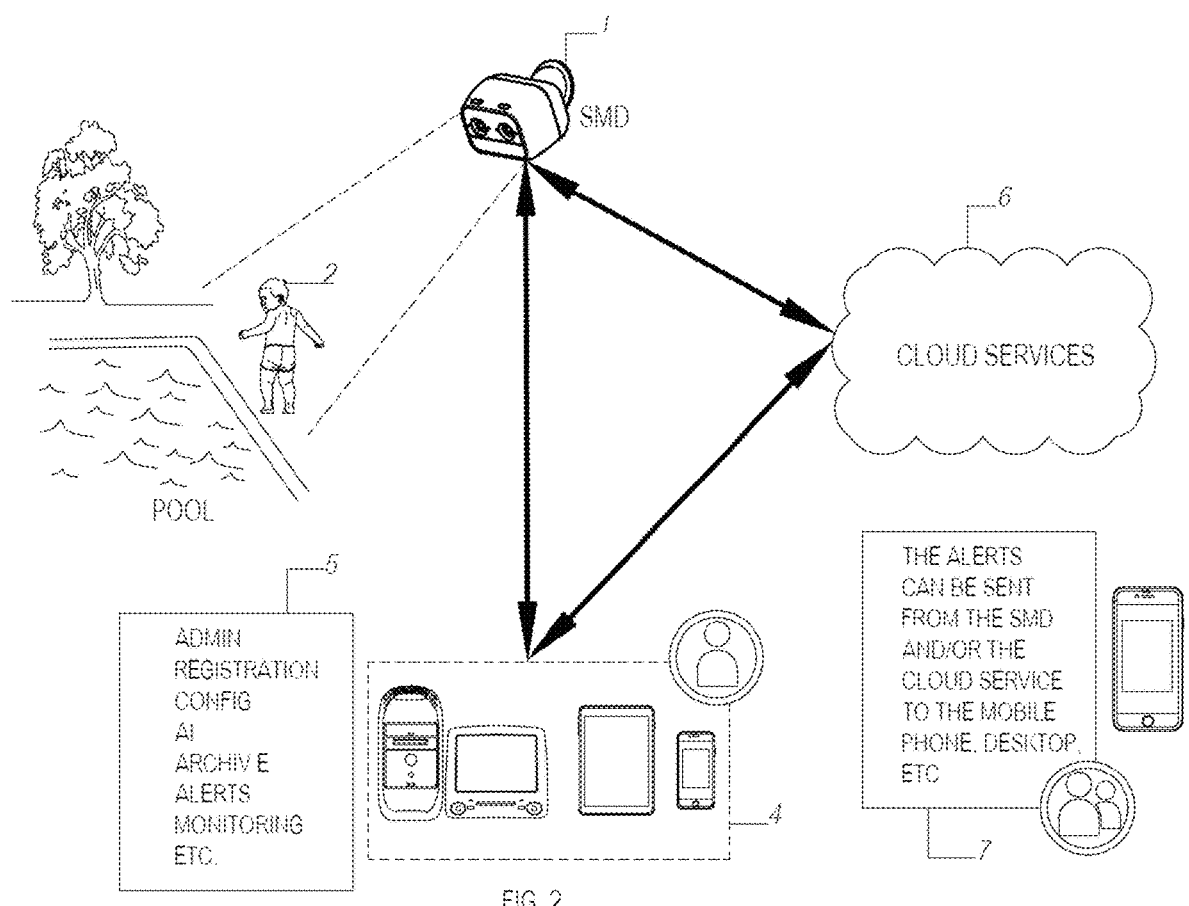
FIG. 2 is a system view of the process of operations, in accordance with an example.

The system processes the captured image and/or video sequence in order to classify humans 3 and/or identify faces and/or other objects of interest in a scene and may encode the video content using a video compression technique, such as JPEG-2000. In FIG. 2, the encoded data can then be stored locally and/or transmitted over a private or public, wired, such as Ethernet, USB, etc., or wireless network, such as a WiFi network, to the cloud service 6, for storage and/or archive. Based on the gathered metadata information (for example, time, locations, etc), the system may trigger alarms and archive the sequences corresponding to events predefined by a user 4 (for example, a baby in close proximity to a pool, a baby getting far from an adult, an elderly person leaving a yard, etc.). The system can optionally store the transmitted image and/or video and associated metadata, either continuously or when other customized or preset events occur. The camera may be a conventional webcam. Such conventional webcams may come with standard software for capturing and storing video content on a frame by frame basis. All of the images and/or video content may be processed by each of the cameras and/or by the SMD 1 and/or by a cloud services 6.

Alternatively, the camera can be a camera device that includes a stand-alone video camera with an integrated CPU that is configured to be wired, such as Ethernet, USB, etc., or wirelessly connected to a private or public network, such as, WiFi network for transmitting live video images. An exemplary camera device is a Hawking Model No. HNC320W/NC300 camera device. The video content is analyzed to detect the occurrence of events in the scene (e.g. infant too close to a stove etc.). The goal of the analysis is to detect events in the scene and/or to identify regions of interest. The information about the objects in the scene is then passed on in order to encode the object with more detail. The video may then be encoded using a standard compression technique, such as JPEG 2000. The encoded data may be further scrambled or encrypted in order to heighten security and ensure privacy, and digitally signing it for source authentication and data integrity verification. Various metadata, for example, data about location and time, as well as about the region in the scene where a dangerous event or person at risk has been detected, gathered from the scene as a result of the analysis can also be transmitted to the SMD 1.

In general, metadata relates to information about a video frame and may include simple textual/numerical information, for example, the location of the camera and date/time, as mentioned above, or may include some more advanced information, such as the bounding box of the region where an event or vulnerable individual has been detected by the video analysis module or the bounding box where a face, body, or hazardous object has been detected. The metadata may even be derived from face recognition, and therefore could include the name of the recognized persons. Metadata is generated as a result of the video analysis and may be represented in XML using MPEG-7, for example, and transmitted separately from the video only when a dangerous event is detected. As it usually corresponds to a very low bit rate, it may be transmitted separately from the video, for instance using TCP-IP. Whenever a metadata message is received, it may be used to trigger an alarm on the monitor of the health care worker, parent or guardian in the vicinity or be used to generate a text message and sent to a device, such as a computer, cell phone, wearable, or laptop computer.

Various techniques are known for detecting a change in a video scene. Virtually all such techniques can be used with the present invention. In order to reduce the complexity of the video analysis, a simple frame difference algorithm may be used. As such, the background is initially captured and stored. Regions corresponding to changes are merely obtained by taking the pixel by pixel difference between the current video frame and the stored background, and by applying a threshold to determine distances between objects of concern (vulnerable individuals and hazardous objects). For example, the change detection may be determined by simply taking the difference between the current frame and a reference background frame and determining if the difference is greater than a threshold. The threshold may be selected based on the level of illumination of the scene and the automatic gain control and white balance in the camera and can be interpreted as distances between persons of concern and a hazardous accessory or land feature. The automatic gain control relates to the gain of the sensor while the white balance relates to the definition of white. As the lighting conditions change, the camera may automatically change these settings, which may affect the appearance of the captured images (e.g. they may be lighter or darker), hence adversely affecting the change detection technique. To remedy this, the threshold may be adjusted upwardly or downwardly for the desired contrast.

All of the aforementioned cameras and sensor components may be connected to the SMD 1 having onboard memory, software, wired and/or wireless networks (such as but not limited to Bluetooth, Wi-Fi, etc.) and powered by rechargeable batteries (comprised of but not limited to nickel hydride and/or lithium ion batteries). In view of the disclosure provided herein, an application is created by techniques known to those of skill in the art using hardware, languages, and development environments known to the art. Those of skill in the art will recognize that applications are written in several languages including, by way of non limiting examples, C, C++, C#, Objective-C, Java, Javascript, Pascal, Object Pascal, Python, Ruby, VB.NET, WML, and XHTML/HTML with or without CSS, or combinations thereof. The software also compatible with a plurality of operating systems such as but not limited to Linux, Windows, Apple, and Android, and compatible with a multitude of hardware platforms such as, but not limited to: personal desktops, laptops, tablets, smartphones, wearables and the like. Suitable application development environments are available from several sources.

Commercially available development environments include, by way of non-limiting examples, AirplaySDK, alcheMo, Appcelerator, Celsius, Bedrock, Flash Lite, .NET Compact Framework, Rhomobile, and workLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android SDK, BlackBerry SDK, BREW SDK, Palm. OS SDK, Symbian SDK, webOS SDK, and Windows Mobile SDK. Those of skill in the art will recognize that several commercial forums are available for distribution of mobile applications including, by way of non-limiting examples, Apple App Store, Google Play, Chrome Web Store, BlackBerry App World, App Store for Palm devices, App Catalog for webOS, Windows Marketplace for Mobile, Ovi Store for Nokia devices, Samsung Apps, and Nintendo DSi Shop.

Each of the above-described embodiments is able to be implemented, for example, using a machine-readable medium or article which is able to store an instruction or a set of instructions that, if executed by a machine, cause the machine to perform the operations described herein. Such a machine is able to include, for example, any suitable processing platform, computing platform, computing device, processing device, electronic device, electronic system, computing system, processing system, computer, processor, or the like, and is able to be implemented using any suitable combination of hardware and/or software. The machine-readable medium or article is able to include, for example, any suitable type of memory unit, memory device, memory article, memory medium, storage device, storage article, storage medium and/or storage unit; for example, memory, removable or non-removable media, erasable or non-erasable media, writeable or re-write-able media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like.

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. The compilation is often performed, at least in part, to create an executable program. In some embodiments, a computer program includes one or more executable compiled applications. In some embodiments, the computer program includes a web browser plug-in (e.g., extension, etc.). In computing, a plug-in is one or more software components that add specific functionality to a larger software application. Makers of software applications support plugins to enable third party developers to create abilities that extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including Adobe® Flash® Player, Microsoft® Silverlight®, and Apple® QuickTime®.

In view of the disclosure provided herein, those of skill in the art will recognize that several plug-in frameworks are available that enable the development of plug-ins in various programming languages, including by way of non-limiting examples, C++, Delphi, Java™, PHP, Python™, and VB .NET, or combinations thereof. Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called micro-browsers, mini browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser. Software Modules.

As shown in FIG. 2, in some embodiments, the platforms, systems, media, and methods disclosed herein include software, server, and/or database modules, cloud services 6, or use of the same. Accordingly, the AI algorithms process, as disclosed above, may be processed by each of the cameras and/or by the SMD 1 and/or by cloud services 6. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud services 6. In some embodiments, software modules are hosted on one or more machines in one location. In other embodiments, software modules are hosted on one or more machines in more than one location.

FIG. 2 showing users 4 having access to functions such as but not limited to account registration and setup (contact information, subscription payments, notification preferences, etc.); customizing SMD 1 operating parameters 5 choosing the area that should be monitored, choosing who the system should detect: baby, child, adult, etc., should the system look for a baby getting far from an adult, set the distance that should consider as "far," set the sensitivity of the system for some of the parameters 5, schedule operations like when to start and Stop detecting, how long to remain active, when to engage local area networks and transmit data, training options for various scenario detections, and status (which SMD 1 units are collecting data, problems, calibrations, etc.). The software also could be compatible with a plurality of operating systems such as, but not limited to Linux, Windows, Apple and Android and compatible with a multitude of hardware platforms including, but not limited to: personal desktops, laptops, tablets, smartphones, and the like. The figure shows the SMD 1 having onboard monitoring operations (collecting and transmitting data) with sensors (as previously described) and activated according to user 4 presets and activating alarm controls (errors, emergency threshold breaches, etc.) as necessary. FIG. 2 also shows users 4 and SMD 1 being connected by means of cloud services 6. Said cloud services 6 having algorithms and/or routine operations such as but not limited to administrative services (sensor registrations etc.); SMD 1 configurations (power-on time, dormant mode, time presets, transmission schedules, transmission rates, etc.); AI algorithms (supervised individual recognition, caretaker recognition, training options for various scenario detections, prediction analytics, trend analysis, risk reporting, etc.); archives (recording footage libraries, configuration setting history, advanced encryption standards such as Rivest-Shamir-Adleman, triple data encryption standard, etc.); and alerts 7 (emergency notifications, real-time viewing, etc. via text messages SMS, email, and the like); The SMD 1 software having the capability to transfer data and either remotely (wirelessly) or by means of localized USE and/or network cables, etc. The SMD 1 and/or cloud services 6 may have the capability to process the AI algorithms, for example, for supervised individual recognition, etc. Alerts 7 to the caretakers can be sent from the SMD 1 and/or the cloud services 6.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

Although the present invention has been described in terms of various embodiments, it is not intended that the invention be limited to these embodiments. Modification within the spirit of the invention will be apparent to those skilled in the art.

It is additionally noted and anticipated that although the device is shown in its most simple form, various components and aspects of the device may be differently shaped or modified when forming the invention herein. As such those skilled in the art will appreciate the descriptions and depictions set forth in this disclosure or merely meant to portray examples of preferred modes within the overall scope and intent of the invention and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the scope of the invention.

What is claimed is:

1. A system and method for recognizing unattended humans who require supervision, the system and method comprising:
    a safety monitoring device (SMD);
    monitoring content from a built-in camera;
    processing content from the camera using an artificial intelligence (AI) algorithm;
    using an AI algorithm to detect an unattended human who requires supervision based on a predefined rule;
    wherein one or more AI algorithms are used to detect one or more hazardous objects, areas, conditions, or circumstances;
    wherein using one or more sensors to detect hazardous conditions;
    wherein one or more sensors is built-in to the one or more cameras; and
    notifying an authorized individual of the presence of an unattended human who requires supervision;
    wherein the notification includes the unattended human's hazard.

2. The system of claim 1, wherein the content comprises one or more images and/or videos.

3. The system of claim 1, further comprising monitoring content from one or more cameras.

4. The system of claim 3, wherein the one or more cameras are external to the SMD.

5. The system of claim 1, further comprising using one or more AI algorithms.

6. The system of claim 5, wherein the one or more AI algorithms are processed by the SMD.

7. The system of claim 5, wherein the one or more AI algorithms are processed by the one or more cameras.

8. The system of claim 5, wherein the one or more AI algorithms are processed by one or more cloud services.

9. The system of claim 1, further comprising detecting one or more unattended humans who require supervision based on one or more predefined rules.

10. The system of claim 1, further comprising detecting one or more unattended humans who require supervision based on one or more user-defined rules.

11. The system of claim 1, wherein the one or more sensors is built-in the SMD.

12. The system of claim 1, wherein the one or more sensors is a stand-alone device.

13. The system of claim 1, wherein the authorized individual notified is one or more members of a user-defined contact list.

14. The system of claim 1, wherein the notification is one or more of an alarm, a sound, a message, a phone call, or an alert on authorized individual's user equipment (UE).

15. The system of claim 1, further comprising customizing one or more recognition capabilities, wherein the one or more recognition capabilities are configured to recognize a specific human.

16. The system of claim 15, wherein the one or more recognition capabilities are configured to recognize one or more animals.

17. The system of claim 15, wherein the one or more recognition capabilities are configured to recognize a distance between subjects.

18. The system of claim 17, wherein a distance considered hazardous is predefined.

19. The system of claim 17, wherein the distance considered hazardous is user-defined.

20. The system of claim 1, wherein the SMD is connected to one or more of a wired network, a wireless network, a cellular network, or a satellite network.

21. The system of claim 3, wherein the one or more cameras are connected to one or more of a wired network, a wireless network, a cellular network, or a satellite network.

22. The system of claim 1, wherein the one or more sensors are connected to one or more of a wired network, a wireless network, a cellular network, or a satellite network.

* * * * *